United States Patent
Bolger et al.

(10) Patent No.: US 9,712,942 B2
(45) Date of Patent: *Jul. 18, 2017

(54) PERFORMANCE OF SECURE MOBILE APPLICATIONS

(71) Applicant: International Business Machines Corporation, Armonk, NY (US)

(72) Inventors: Ann-Louise Bolger, Windaroo (AU); Scott A. Exton, Gold Coast (AU); Yaqian Fang, Gold Coast (AU); Christopher J. Hockings, Burleigh Waters (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/367,437

(22) Filed: Dec. 2, 2016

(65) Prior Publication Data

US 2017/0180908 A1    Jun. 22, 2017

Related U.S. Application Data

(63) Continuation of application No. 15/168,728, filed on May 31, 2016, which is a continuation of application No. 15/041,653, filed on Feb. 11, 2016, now Pat. No. 9,426,241, which is a continuation of application No. 14/974,480, filed on Dec. 18, 2015.

(51) Int. Cl.
| | |
|---|---|
| *G06F 15/16* | (2006.01) |
| *H04W 4/00* | (2009.01) |
| *H04L 29/08* | (2006.01) |
| *H04L 12/927* | (2013.01) |

(52) U.S. Cl.
CPC ........... *H04W 4/001* (2013.01); *H04L 47/803* (2013.01); *H04L 67/02* (2013.01); *H04L 67/141* (2013.01); *H04L 67/22* (2013.01)

(58) Field of Classification Search
CPC ...................................................... H04L 67/22
USPC ....................................................... 709/203
See application file for complete search history.

(56) References Cited

U.S. PATENT DOCUMENTS

| | | |
|---|---|---|
| 6,178,461 B1 | 1/2001 | Chan et al. |
| 8,316,098 B2 | 11/2012 | Luna et al. |
| 8,352,605 B2 | 1/2013 | Samuels et al. |
| 9,021,048 B2 | 4/2015 | Luna et al. |
| 9,426,241 B1 | 8/2016 | Bolger et al. |
| 2012/0047509 A1 | 2/2012 | Ben-Itzhak |
| 2015/0019637 A1 | 1/2015 | Backholm |

OTHER PUBLICATIONS

Unknown; "Analyze your site performance"; Google Developers, PageSpeed Tools; Last Updated May 27, 2015; Printed Aug. 13, 2015; pp. 1-2; <https://developers.google.com/speed/pagespeed/?csw=1>.

(Continued)

*Primary Examiner* — Hamza Algibhah
(74) *Attorney, Agent, or Firm* — David S. Richart

(57) ABSTRACT

A request for a first resource by a user is received. In response to receiving the request for a first resource, a second resource is determined based on the first resource and a resource usage pattern of the user. A response to the request for the first resource is provided. The response includes the first resource and the second resource.

1 Claim, 3 Drawing Sheets

(56) References Cited

OTHER PUBLICATIONS

Kolb, John et al.; "Cloud-Based, User-Centric Mobile Application Optimization"; pp. 26-35; 2015 IEEE International Conference on Cloud Engineering (IC2E); 2015 IEEE International Conference on Cloud Engineering (IC2E) 2015.

Song, Hokwon et al.; "Usage Pattern-Based Prefetching: Quick Application Launch on Mobile Devices"; Computational Science and Its Applications—ICCSA 2012; 12th International Conference Salvador de Bahia; Brazil, Jun. 2012 Proceedings; Part III; B. Murgante et al. (Eds.); LNCS 7335; pp. 227-237; 2012; Copyright Springer-Verlag Berlin Heidelberg 2012.

Bolger et al.; U.S. Appl. No. 14/974,480; filed Dec. 18, 2015; Entitled "Performance of Secure Mobile Applications"; 22 pages.

List of IBM Patents or Patent Applications Treated As Related; Filed Herewith; 2 pages.

PERFORMANCE OF SECURE MOBILE APPLICATIONS

BACKGROUND OF THE INVENTION

The present invention relates generally to the field of computer applications, and more particularly to improved performance of mobile device applications.

A mobile application is a computer program designed to run on mobile devices such as smartphones and tablet computers. Mobile application development for mobile devices requires consideration of the constraints of mobile devices as compared with personal computers. Mobile devices typically have less powerful processors than personal computers and have user interface constraints such as a smaller screen. For access and interaction with enterprise systems, mobile device user interfaces rely on back-ends to support data routing, security, authentication, and authorization. This functionality is typically supported by various middleware components such as application servers.

SUMMARY

A request for a first resource by a user is received. In response to receiving the request for a first resource, a second resource is determined based on the first resource and a resource usage pattern of the user. A response to the request for the first resource is provided. The response includes the first resource and the second resource.

DETAILED DESCRIPTION

Embodiments of the present invention recognize that society relies heavily on mobile phones and mobile applications. Embodiments of the present invention recognize that companies and organizations in various business industries, such as the financial industry, use mobile application performance to gain a competitive advantage and otherwise distinguish themselves from competitors. Embodiments of the present invention recognize that current secure mobile applications generally operate by requiring a user to authenticate and interact with the application user interface prior to requesting each resource content from a location remote from the mobile device, which is a time-consuming process for the user. Embodiments of the present invention further recognize that no current improvements focus on efficiently retrieving and displaying requested content.

Embodiments of the present invention provide for improved performance of secure mobile applications by using past mobile application usage by a user to predict and request content that may be requested by the user in the future.

Figure 1:
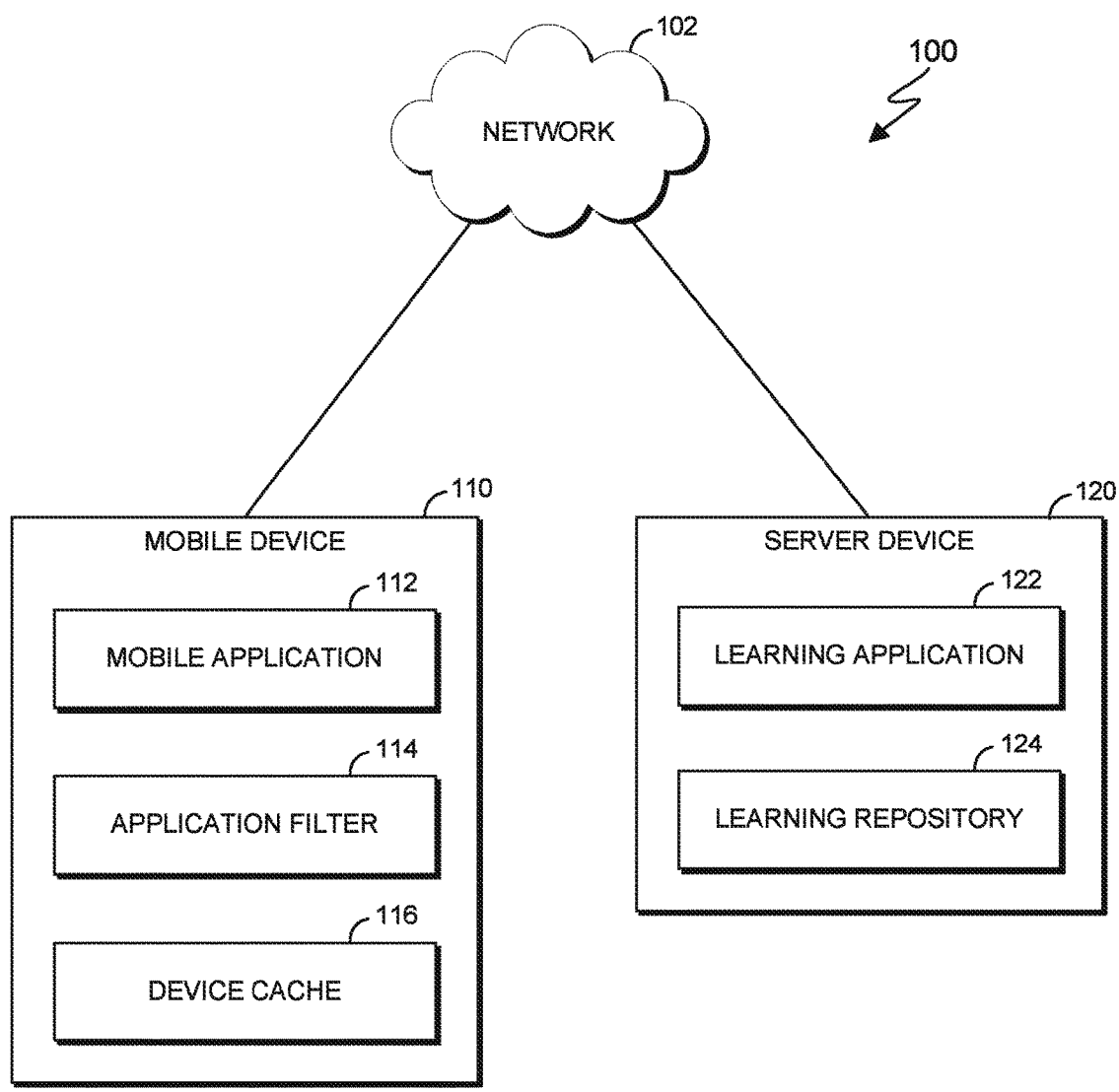
FIG. 1 is a functional block diagram of a distributed data processing environment, in accordance with an embodiment of the present invention.

The present invention will now be described in detail with reference to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

In the illustrated embodiment, distributed data processing environment 100 includes mobile device 110 and server device 120. Mobile device 110 and server device 120 are interconnected through network 102. In an embodiment, distributed data processing environment 100 may additionally include any other computing device connected to network 102.

In an embodiment, network 102 may be a local area network (LAN), a telecommunications network, a wide area network (WAN) such as the Internet, or any combination of the three, and can include wired, wireless, or fiber optic connections. In general, network 102 may be any combination of connections and protocols supports communications between mobile device 110, server device 120, and any other computing device connected to network 102, in accordance with embodiments of the present invention.

In an embodiment, mobile device 110 may generally be any electronic device or combination of electronic devices capable of executing computer readable program instructions. In example embodiments, mobile device 110 may be a mobile phone, personal digital assistant, tablet computer, personal computer, or workstation. In an embodiment, mobile device 110 may be a computer system utilizing clustered computers and components (e.g., database server devices, application server devices) that act as a single pool of seamless resources when accessed by elements of distributed data processing environment 100, such as in a cloud computing environment. Mobile device 110 may include components as depicted and described with respect to FIG. 3.

In the illustrated embodiment, mobile device 110 includes mobile application 112, application filter 114, and device cache 116. In an alternative embodiment, mobile application 112 or application filter 114 may be located on another networked computing device (not shown), and mobile application 112 or application filter 114 may access and communicate with mobile device 110, including device cache 116, through network 102.

In an embodiment, mobile application 112 may be a computer program, application, or subprogram of a larger program that communicates with application filter 114 for retrieving, accessing, and utilizing a resource requested by mobile application 112. For example, mobile application 112 may be a web browser, calendar, weather application, stock market application, banking application, or music application. To further illustrate, where mobile application 112 is a banking application (e.g., for transferring money among bank accounts of a user), mobile application 112 may, for example, request a bank account balance as a resource. In an embodiment, mobile application 112 may be connected to one or more user interface devices (not shown) to allow a user to utilize mobile application 112 (e.g., to indicate a particular resource to retrieve and display).

A user interface is the information, such as graphic, text, and sound, a program presents to a user and the control sequences the user employs to control the program. There are many types of user interfaces. For example, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. GUIs were introduced for computers in response to the perceived steep learning curve of command-line interfaces, which required commands to be typed on the keyboard. The actions in GUIs may be performed by a user through direct manipulation of the graphical elements.

In an embodiment, application filter 114 may be a computer program, application, or subprogram of a larger program that communicates with mobile application 112, device cache 116, and server device 120 for retrieving a resource requested by mobile application 112. In an embodiment, application filter 114 monitors all resource requests from mobile application 112 and all responses (e.g., a requested resource) to mobile application 112 from server device 120 or any other networked computing device (not shown). In an embodiment, application filter 114 may be integrated with mobile application 112 (e.g., as an application programming interface (API), plug-in, add-on, extension).

In an embodiment, device cache 116 may be memory capable of storing resources (e.g., data, instructions, addresses) for utilization by mobile application 112, including resources predicted by learning application 122 to be requested by mobile application 112 in the future (potential resources). Device cache 116 may be used to reduce the time taken to access a resource as compared with accessing a resource from a main memory (e.g., memory 302, depicted and described with respect to FIG. 3). In an embodiment, device cache 116 may be organized as a hierarchy of multiple memory levels. In an embodiment, device cache 116 may be cache 303, depicted and described with respect to FIG. 3.

In an embodiment, server device 120 may generally be any electronic device or combination of electronic devices capable of executing computer readable program instructions. In example embodiments, server device 120 may be a workstation, personal computer, personal digital assistant, or mobile phone. In an embodiment, server device 120 may be a computer system utilizing clustered computers and components (e.g., database server devices or application server devices) that act as a single pool of seamless resources when accessed by elements of distributed data processing environment 100, such as in a cloud computing environment. In an embodiment, mobile device 110 may include components as depicted and described with respect to FIG. 3.

In the illustrated embodiment, server device 120 includes learning application 122 and learning repository 124. In an alternative embodiment, learning application 122 or learning repository 124 may be located on mobile device 110. In yet another alternative embodiment, learning application 122 or learning repository 124 may be located on another computing device (not shown) connected to network 102.

In an embodiment, learning application 122 may be a computer program, application, or subprogram of a larger program that communicates with mobile device 110 and learning repository 124 for retrieving a resource requested by mobile application 112 and for predicting and retrieving a resource that may be requested from mobile application 112 in the future. In an embodiment, functions for predicting potential resources for future use include monitoring resource requests from mobile application 112 and determining, for each resource requested by mobile application 112, the frequency at which the resource is requested and the sequence in which the resource is requested relative to other requested resources. As an example, where mobile application 112 is a banking application, learning application 122 may determine that where the account balance of account A is requested, a subsequent request to transfer money from account B to account A has been made 10 times, or 80% of the time, or twice as often as a subsequent request to transfer money from account C to account A.

In an embodiment, learning application 122 determines the resource information on a per-user basis. In other words, learning application 122 determines the resource information of each user of mobile application 112 independently from the resource information of other users of mobile application 112. In an embodiment, learning application 122 determines resource frequencies and sequences from all requests made from a user of mobile application 112 or, alternatively, from the current log-in session of a user of mobile application 112.

In an embodiment, learning repository 124 contains the resource information determined by learning application 122. In an embodiment, learning repository 124 stores the resource information on a per-user basis. In other words, learning repository 124 stores the resource information for each user of mobile application 112 independently from the resource information for other users of mobile application 112. In an embodiment, the resource information includes frequency and sequence information for a resource with respect to all requests for the resource from mobile application 112 as well as frequency and sequence information for the resource with respect to the current log-in session of mobile application 112. The stored resource information may be accessed and updated by learning application 122 for each user of mobile application 112, in accordance with embodiments of the present invention.

In an embodiment, learning repository 124 may be implemented using any non-volatile storage media known in the art. For example, learning repository 124 may be implemented with a tape library, optical library, one or more independent hard disk drives, or multiple hard disk drives in a redundant array of independent disks (RAID). Learning repository 124 may be implemented using any suitable storage architecture known in the art. For example, learning repository 124 may be implemented with a relational database or an object-oriented database.

Figure 2:
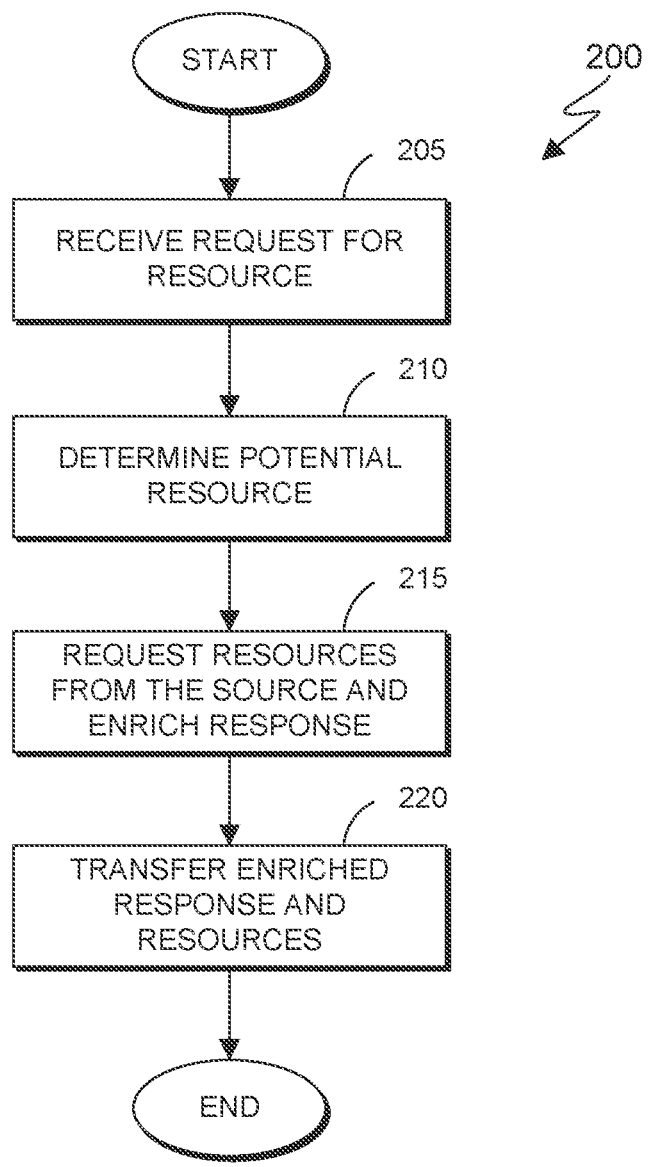
FIG. 2 is a flowchart of operational steps for providing efficient performance of secure mobile applications.

FIG. 2 is a flowchart of workflow 200 illustrating operational steps for providing efficient performance of secure mobile device applications. In the illustrated embodiment, the steps of workflow 200 is performed by learning application 122. In an alternative embodiment, the steps of workflow may be performed by any other computer program, or programs, while working with learning application 122. In an embodiment, learning application 122 begins performing the steps of workflow 200 in response to receiving an indication to provide efficient performance of mobile application 112. In an embodiment, a user may provide the indication to provide efficient performance of mobile application 112 through the user interface of mobile application 112.

Learning application 122 receives a request for a resource (step 205). In other words, learning application 122 receives a request from mobile application 112 to retrieve a resource. In an embodiment, application filter 114 receives the resource request from mobile application 112, and application filter 114 forwards the resource request to learning application 122 in response to determining that there is not a local resource matching the requested resource (i.e., device cache 116 does not contain a resource matching the requested resource). In an embodiment, the resource request is initially made to mobile application 112 by a user through the user interface of mobile application 112.

Learning application 122 determines potential resources (step 210). In other words, learning application 122 determines one or more resources (potential resources), in addition to the requested resource, that are likely to be subsequently requested by the user of mobile application 112. In an embodiment, learning application 122 updates the resource information associated with the requested resource in learning repository 124 (predictive resource information), and learning application 122 determines the potential resources based on the resource information associated with the requested resource.

In an embodiment, predictive information includes the frequency at which the requested resource is requested by the user of mobile application 112 and the sequences in which the resource has been requested relative to other resources requested by the user of mobile application 112. In an embodiment, predictive resource information includes frequency and sequence information for the resource with respect to all requests for the resource from the user of mobile application 112 as well as frequency and sequence information for the resource with respect to requests from the current log-in session of the user of mobile application 112.

As an example, where resource D is requested by mobile application 112, if learning application 122 determines that following a request for resource D, resource E is thereafter requested 75% of the time, and that following a request for resource E, resource G is thereafter requested 60% of the time, then learning application 122 may determine that resources E and G are potential resources that are likely to be requested by the user of mobile application 112 following the request for resource D.

Learning application 122 requests resources and enriches the response (step 215). In other words, learning application 122 forwards the resource request, which includes a request for the originally requested resource as well as the determined potential resource (determined in step 210), to the resource source (not shown) and retrieves the originally requested resource and the potential resource. In an embodiment, upon receiving the response from the resource source, learning application 122, prior to forwarding the response to mobile device 110, enriches the response information with an indication that there is a potential resource associated with the originally requested resource. In other words, in addition to the requested resource, learning application 122 attaches to the response information an indication of each potential resource that has been additionally requested from the resource source by learning application 122. In an embodiment, the indication is an HTTP header that has been pre-defined for the system. For example, where mobile application is a banking application, and the potential resource being requested by learning application 122 is a bank account balance, the HTTP header may be "Cache-Control: preload=/account/balancejsp".

Learning application 122 transfers the enriched response and the resources (step 220). In other words, learning application 122 transfers the response information, which includes the originally requested resource and the one or more indications of a potential resource, to mobile device 110. In an embodiment, application filter 114 receives the response and determines if the response includes an indication of a potential resource associated with the originally requested resource (e.g., an HTTP header attached to the response). If the response includes an indication of a potential resource, a separate thread may be started to retrieve the indicated potential resource from server device 120 and store the potential resource in device cache 116 until the resource is requested by mobile application 112. In an embodiment, application filter 114 then removes the header from the response and transfers the response, and originally requested resource information, to mobile application 112.

Figure 3:
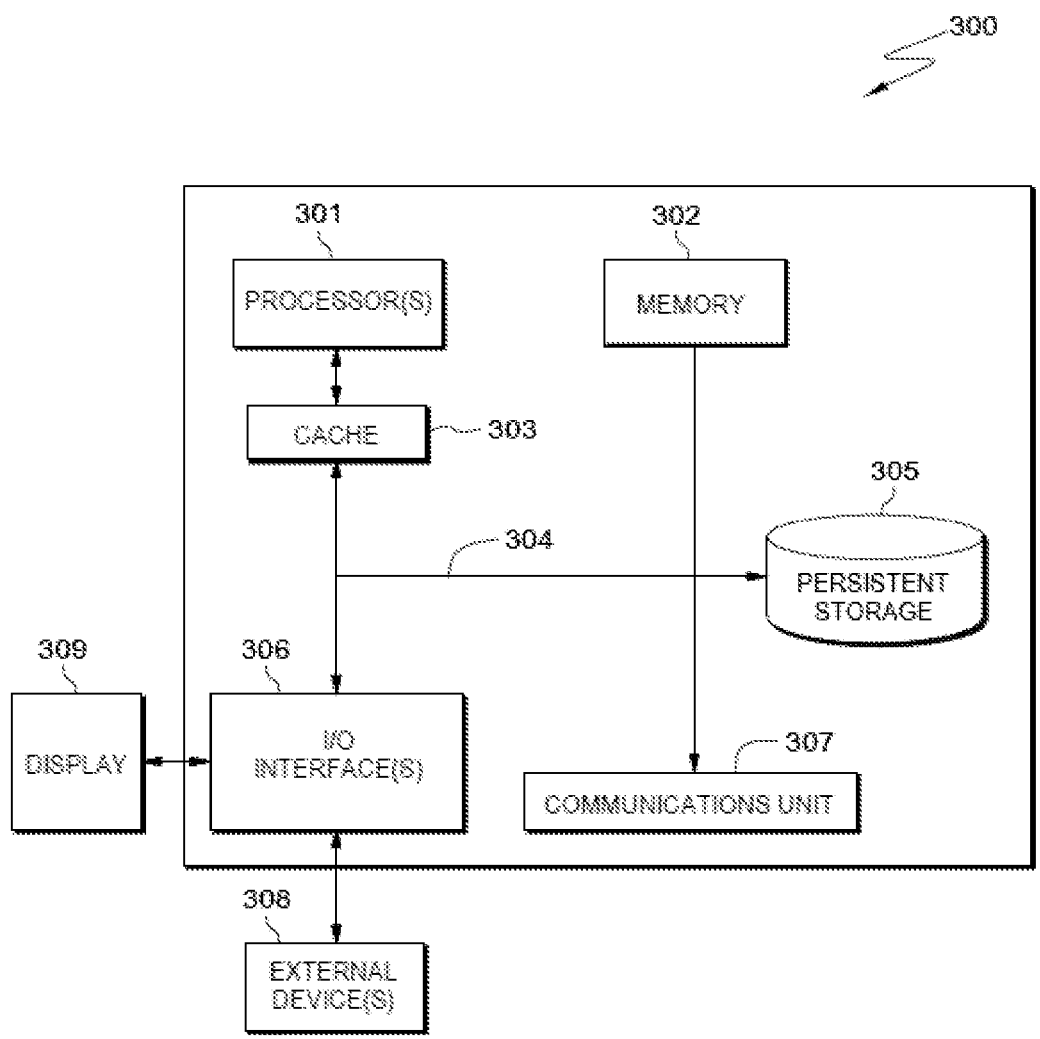
FIG. 3 is a functional block diagram of components of the mobile device of FIG. 1, in accordance with an embodiment of the present invention.

FIG. 3 depicts computing system 300, which illustrates components of mobile device 110 and server device 120, which includes learning application 122. Computing system 300 includes processor(s) 301, cache 303, memory 302, persistent storage 305, communications unit 307, I/O interface(s) 306, and communications fabric 304. Communications fabric 304 provides communications between cache 303, memory 302, persistent storage 305, communications unit 307, and I/O interface(s) 306. Communications fabric 304 can be implemented with any architecture designed for passing data and/or control information between processors (e.g., microprocessors, communications and network processors, etc.), system memory, peripheral devices, and any other hardware components within a system. For example, communications fabric 304 may be implemented with one or more buses or a crossbar switch.

Memory 302 and persistent storage 305 are computer readable storage media. In an embodiment, memory 302 includes random access memory (RAM) (not shown). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 through I/O interface(s) 306. I/O interface(s) 306 also connect to display 309.

Display 309 provides a mechanism to display data to a user and may be, for example, a computer monitor.

The descriptions of the various embodiments of the present invention have been presented for purposes of illustration, but are not intended to be exhaustive or limited to the embodiments disclosed. Modifications and variations of the presented embodiments will be apparent to those of ordinary skill in the art without departing from the scope and spirit of the invention. The terminology used herein was chosen to best explain the principles of the embodiment, to best explain the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for improving performance of mobile applications, the computer system comprising:
   one or more computer processors;
   one or more computer readable storage media; and
   program instructions, stored on the one or more computer readable storage media, for execution by at least one of the one or more computer processors, the program instructions comprising:
      program instructions to receive a request for a first resource from a user of an application, wherein the first resource corresponds to the application, and wherein the application is located on a first device, and wherein the first resource is located on a second device;
      program instructions to receive one or more previous requests for the first resource from the user during a first log-in session of the application; program instructions to receive one or more previous requests for a second resource from the user during the first log-in session of the application, wherein the second resource corresponds to the application, and wherein the second resource is located on the second device; program instructions to receive one or more previous requests for a third resource from the user during the first log-in session of the application, wherein the third resource corresponds to the application, and wherein the third resource is located on the second device;
   program instructions to determine a frequency of the second resource, wherein the frequency of the second resource is proportional to a number of the one or more previous requests for the second resource that are received immediately after one of the one or more previous requests for the first resource; program instructions to determine a frequency of the third resource, wherein the frequency of the third resource is proportional to a number of the one or more previous requests for the third resource that are received immediately after one of the one or more previous requests for the first resource;
   program instructions to, responsive to determining that the frequency of the second resource is greater than the frequency of the third resource, determine a resource usage pattern for the first resource based on the second resource;
   program instructions to provide to the first device a response to the request for the first resource based on the resource usage pattern, wherein the response includes the first resource and an indication of the second resource, wherein the indication of the second resource comprises an HTTP header attached to the response; and
   program instructions to, responsive to receiving the indication of the second resource, request the second resource; program instructions to, responsive to requesting the second resource, receive the second resource; and program instructions to, responsive to receiving the second resource, store the second resource in a cache, wherein the cache is located on the first device.

* * * * *